(12) United States Patent
Chien (10) Patent No.: US 9,575,578 B2
(45) Date of Patent: *Feb. 21, 2017

(54) METHODS, DEVICES, AND COMPUTER READABLE STORAGE DEVICE FOR TOUCHSCREEN NAVIGATION

(71) Applicant: AT&T Mobility II LLC, Atlanta, GA (US)

(72) Inventor: Ginger Chien, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,324

(22) Filed: Apr. 4, 2016

(65) Prior Publication Data
US 2016/0216776 A1    Jul. 28, 2016

Related U.S. Application Data (63) Continuation of application No. 14/089,441, filed on Nov. 25, 2013, now Pat. No. 9,304,680.

(51) Int. Cl.
*G06F 3/038*     (2013.01)
*G06F 3/0488*    (2013.01)
*G06F 3/0354*    (2013.01)

(52) U.S. Cl.
CPC .......... *G06F 3/038* (2013.01); *G06F 3/03547* (2013.01); *G06F 3/04883* (2013.01); *G06F 2203/04806* (2013.01); *G06F 2203/04808* (2013.01)

(58) Field of Classification Search
CPC ....... G06F 3/04883; G06F 2203/04806; G06F 2203/04808
See application file for complete search history.

(56) References Cited

U.S. PATENT DOCUMENTS

| | | |
|---|---|---|
| 6,278,443 B1 | 8/2001 | Amro et al. |
| 8,314,779 B2 | 11/2012 | Chan et al. |
| 2009/0262086 A1 | 10/2009 | Chen |
| 2009/0288043 A1 | 11/2009 | Willis |
| 2011/0018806 A1 | 1/2011 | Yano |
| 2012/0299873 A1 | 11/2012 | Hung et al. |
| 2013/0002600 A1 | 1/2013 | McCracken |
| 2013/0169579 A1 | 7/2013 | Havnor |
| 2013/0207929 A1 | 8/2013 | Farmer |

FOREIGN PATENT DOCUMENTS

WO        2009080653        7/2009

OTHER PUBLICATIONS

Albinsson et al. "High Precision Touch Screen Interaction," *CHI* 2003, Apr. 5-10, 2003, ACM.
U.S. Office Action dated May 1, 2015 in U.S. Appl. No. 14/089,441.
U.S. Notice of Allowance dated Oct. 26, 2015 in U.S. Appl. No. 14/089,441.

*Primary Examiner* — Shaheda Abdin
(74) *Attorney, Agent, or Firm* — Hartman & Citrin LLC

(57) ABSTRACT

Methods, devices, and computer readable storage device for navigation of a touchscreen display include calculating a scaled position based on a scaling factor. The scaling factor is based on dimensions of a region of reach and dimensions of the touchscreen display.

20 Claims, 3 Drawing Sheets

METHODS, DEVICES, AND COMPUTER READABLE STORAGE DEVICE FOR TOUCHSCREEN NAVIGATION

CROSS-REFERENCE TO RELATED APPLICATIONS

This application is a continuation of U.S. patent application Ser. No. 14/089,441, filed Nov. 25, 2013, now U.S. Pat. No. 9,304,680, which is incorporated herein by reference in its entirety.

TECHNICAL FIELD

The present disclosure relates generally to touchscreen navigation.

BACKGROUND

An anchored finger includes one in which the proximal end of the finger is anchored. For example, the proximal end of the finger may be anchored because a hand that includes the finger is used to hold a device and the finger is used to contact a touchscreen display of the device.

It is difficult to navigate a relatively large touchscreen display with an anchored finger where the size of the display is larger than the reach of the finger. Currently, to navigate the entire touchscreen display, the finger has to be unanchored or two fingers are needed to reach all areas of a large display. Reaching all areas of the display is necessary to convey literal location information for making selections or indicating larger gestures.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present disclosure.

According to an illustrated embodiment, a method includes calculating a scaled position based on a value of a scaling factor. The scaling factor is based on dimensions of a region of reach and dimensions of the touchscreen display. The region of reach corresponds to a portion of a touchscreen display of a device. The value of the scaling factor is based on dimensions of the region of reach, dimensions of the touchscreen display, a movement direction, and an initial touchdown point. The scaled factor is further based on the initial touchdown point and a direct position of a user contact on the touchscreen display.

Devices, and computer readable storage devices described herein facilitate user navigation of a touchscreen display with a single anchored finger. Particularly, the user is able to navigate and interface with graphical elements on a large display with accuracy and reliability, and without clumsy grip changes of a single hand or use of a second hand, because the methods and devices adapt to the limitations of a finger.

DETAILED DESCRIPTION

Detailed illustrative embodiments are disclosed herein. It must be understood that the embodiments described and illustrated are merely examples that may be embodied in various and alternative forms, and combinations thereof. As used herein, the word "illustrative" is used expansively to refer to embodiments that serve as examples or illustrations. The figures are not necessarily to scale and some features may be exaggerated or minimized to show details of particular components. Specific structural and functional details disclosed herein are not to be interpreted as limiting.

Device

Figure 1:
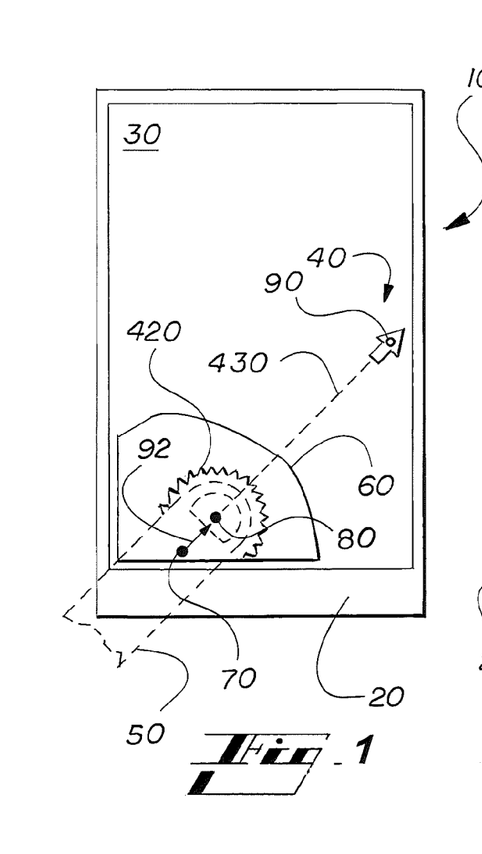
FIG. 1 illustrates a device with a touchscreen display, according to an illustrative embodiment.

Referring to FIG. 1, a device 10 includes a body 20 and a touchscreen display 30. Examples of the device 10 may include mobile phones (e.g., smartphones), computer tablets, game controllers, personal digital assistants (PDA), satellite navigation devices, electronic reading devices, other handheld devices in which touchscreens are common, and the like.

The touchscreen display 30 is configured to display multimedia, such as, for example, text, icons, images, video, links, telephone functions, setup functions, menus, music metadata, messages, graphics, internet content, device status, preference settings, moving images such as animated graphical elements or videos, and the like. For example, the touchscreen display 30 is an electronic visual display that the user can control through simple or multi-touch gestures or otherwise contacting the touchscreen display 30. Such gestures include touching the touchscreen display 30 with one or more fingers or another object such as a stylus, pen, and the like. The user can use gestures to react to what is displayed on the touchscreen display 30 and to control how it is displayed. The touchscreen display 30 is an interface through which the user can interact directly with what is displayed, rather than using a mouse, touchpad, or any other intermediate device. Particularly, as described in further detail below, the user can control movement of a finger (e.g., a thumb 50) in dimensions of a region of reach 60 to control the position of a cursor 40 within dimensions of the touchscreen display 30.

An initial touchdown point 70 $(x_i, y_i)$ is a point where the thumb 50 initially contacts the touchscreen display 30 (e.g., in the region of reach 60).

A direct position 80 (x, y) is a position representing a current point of direct contact by a user on the touchscreen display 30. For example, a direct point of contact is between the thumb 50 and the touchscreen display 30.

A scaled position 90 (x', y') is a point on the touchscreen display 30, calculated as described in further detail below, and generally separated from the direct position 80 (x, y). The scaled position 90 (x', y') can be referred to as a "virtual" point or "offset" point because the scaled position 90 is generally not a point where a user is directly contacting the touchscreen display 30. The cursor 40 is an indicator that is used to indicate the scaled position 90 (x', y') on the touchscreen display 30 and a user can provide input at the scaled position 90 (x', y') by providing input at the direct position 80 (x, y).

Computing Device

Figure 2:
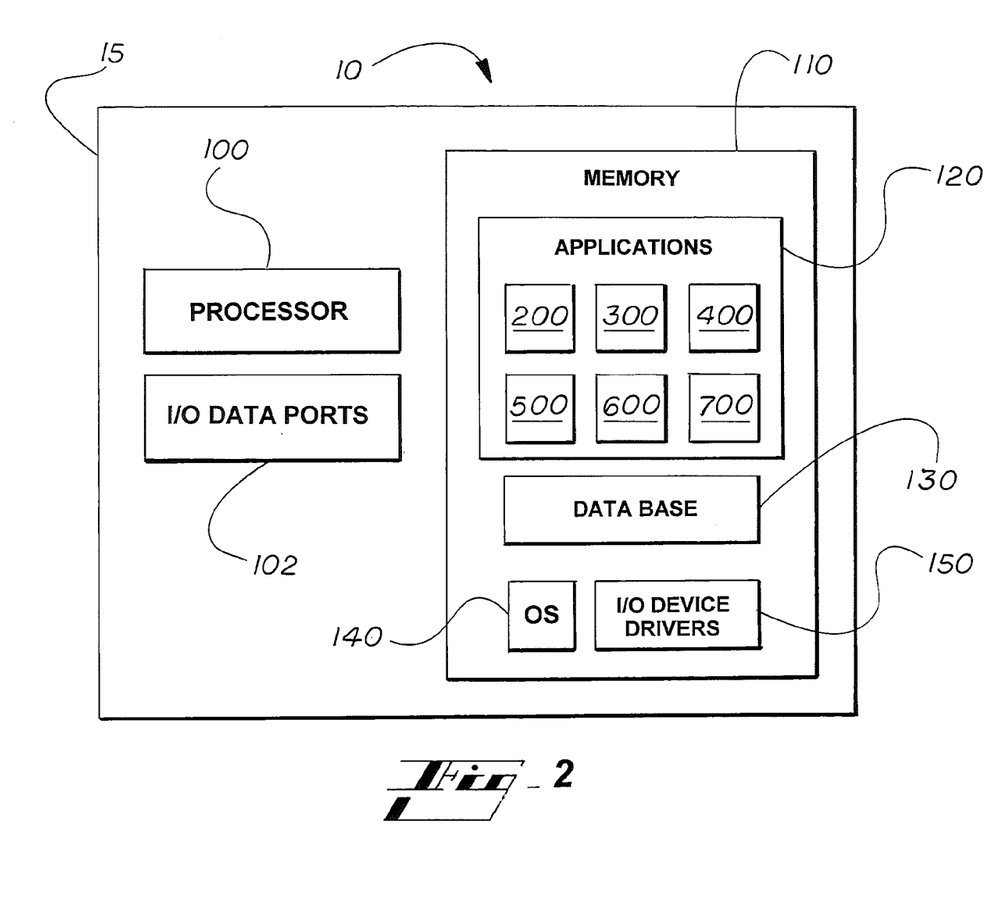
FIG. 2 schematically illustrates a computing device included within the device of FIG. 1.

FIG. 2 is a schematic illustration of a computing device 15 that may be included in device 10. The computing device 15 includes a processor 100 for controlling and/or processing data, input/output (I/O) data ports 102, and a memory 110.

The processor 100 could be multiple processors, which could include distributed processors or parallel processors in a single machine or multiple machines. The processor 100 could include virtual processor(s). The processor 100 could include a state machine, application specific integrated circuit (ASIC), programmable gate array (PGA) including a Field PGA, or state machine. When a processor 100 executes instructions to perform "operations", this could include the processor 100 performing the operations directly and/or facilitating, directing, or cooperating with another device or component to perform the operations.

The computing device 15 can include a variety of computer-readable media, including volatile media, non-volatile media, removable media, and non-removable media. The term "computer-readable media" and variants thereof, as used in the specification and claims, includes storage media. Storage media includes volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that is configured to be used to store information that can be accessed by the computing device 15.

While the memory 110 is illustrated as residing proximate the processor 100, it should be understood that at least a portion of the memory 110 can be a remotely accessed storage system, for example, a server on a communication network, a remote hard disk drive, a removable storage medium, combinations thereof, and the like. Thus, any of the data, applications, and/or software described below can be stored within the memory 110 and/or accessed via network connections to other data processing systems (not shown) that may include a local area network (LAN), a metropolitan area network (MAN), or a wide area network (WAN), for example.

The memory 110 includes several categories of software and data used in the device 10, including, applications 120, a database 130, an operating system (OS) 140, and input/output (I/O) device drivers 150.

As will be appreciated by those skilled in the art, the OS 140 may be any operating system for use with a data processing system. The I/O device drivers 150 may include various routines accessed through the OS 140 by the applications to communicate with devices, and certain memory components. The applications 120 can be stored in the memory 110 and/or in a firmware (not shown) as executable instructions, and can be executed by the processor 100.

The applications 120 include various programs that, when executed by the processor 100, implement the various features of the device 10, including applications for defining a region of reach, calculating a scaling factor, positioning a cursor, improving the precision of the position of the cursor, detecting an initiation gesture, and operating in a scaled mode. The applications 120 are stored in the memory 110 and are configured to be executed by the processor 100.

The applications 120 may be applied to data stored in the database 130, such as the specified parameters, along with data, e.g., received via the I/O data ports 102. The database 130 represents the static and dynamic data used by the applications 120, the OS 140, the I/O device drivers 150 and other software programs that may reside in the memory 110.

It should be understood that FIG. 2 and the description above are intended to provide a brief, general description of a suitable environment in which the various aspects of some embodiments of the present disclosure can be implemented. The terminology "computer-readable media", "computer-readable storage device", and variants thereof, as used in the specification and claims, can include storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium, excluding propagating signals, that can be used to store information that can be accessed by the device shown in FIG. 2.

While the description refers to computer-readable instructions, embodiments of the present disclosure also can be implemented in combination with other program modules and/or as a combination of hardware and software in addition to, or instead of, computer readable instructions.

The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

Region of Reach

Referring again to FIG. 1, the region of reach application 200 includes computer executable instructions that, when executed by the processor 100, cause the processor 100 to perform operations including defining the region of reach 60. The region of reach 60 is associated with the reach of the finger 50 of a hand of a user.

For example, a user holds the device 10 with a left hand and uses the thumb 50 of the left hand to make gestures on the touchscreen display 30. While holding the device 10, the thumb 50 is "anchored" and has a limited reach (e.g., range of motion). Particularly, the reach of the thumb 50 is limited in that the thumb 50 does not have enough extension to reach all points within the dimensions of the touchscreen display 30. The region of reach 60 illustrated in FIG. 1 is located at a lower left corner of the touchscreen display 30 near where the thumb 50 is anchored.

In certain embodiments, there is more than one region of reach 60. For example, a user holds the device 10 with both hands and uses the thumb 50 of each hand to contact the touchscreen display 30. Here, a region of reach 60 is located, for example, in both the lower left corner of the touchscreen display 30 as shown in FIG. 1 and the lower right corner of the touchscreen display 30 (not shown).

According to an illustrative method, to define the region of reach 60 for each of a right hand and a left hand, the region of reach application 200 defines a first region of reach 60 for one hand, as described below. The region of reach application 200 defines a second region of reach 60 for the other hand as a mirror image of the first region of reach 60. According to another illustrative method, the thumb 50 determines the second region of reach 60 by extrapolating the first region of reach 60.

The dimensions and location of the region of reach 60 depend on how a user holds the device 10. For example, the region of reach 60 is commonly located in a lower corner of the touchscreen display 30 for a user that holds the device 10 at a lower end of the body 20. Alternatively, the region of reach 60 is located higher up on the touchscreen display 30 for users that grasp the device 10 higher up on the body 20.

If the user holds the device 10 differently with different hands, the region of reach application 200 defines a first region of reach 60 using the thumb 50 of the left hand and defines a second region of reach 60 using the thumb 50 of the right hand. For example, the device 10 is held at the bottom of the body 20 with the left hand and first region of reach 60 is in a lower left region of the touchscreen display 30. The device 10 is held high up on the body 20 with the right hand and the second region of reach 60 is at the middle right side of the touchscreen display 30.

In certain embodiments, the region of reach 60 is displayed on the touchscreen display 30, for example, by outlining the edge of the region of reach 60 or as a transparent shaded area. Display of the region of reach 60 has some user interface (UI) benefits. For example, display of the region of reach 60 indicates that the device 10 is in a scaling mode (e.g., executing computer executable instructions of a scaling mode application 400) and absence of display of the region of reach 60 indicates that the device 10 is in a normal mode (e.g., executing computer executable instructions of a normal mode application 300).

Displaying the region of reach 60 provides feedback to the user about the region of reach 60 that has been defined by the region of reach application 200, which may prompt the user to adjust the region of reach 60 as described in further detail below. In embodiments where the region of reach 60 is not displayed, the scaling mode can be alternatively indicated, as described below. The normal mode application 300 and the scaling mode application 400 are described in further detail below.

Region of Reach Application

Illustrative methods for defining the region of reach 60 are now described in further detail.

According to a first region definition method, the processor 100 performs operations including accessing data that includes a default size and location of the region of reach 60 and defining the region of reach 60 based on the data. For example, the data includes a square-shaped region with each side equal to approximately two centimeters and a location in a lower left corner of the touchscreen display 30.

According to a second region definition method, the processor 100 performs operations including requesting a user to input a location and dimensions of a region, receiving an input from a user including a location and dimensions of a region, and defining the region of reach 60. For example, the user inputs the location of the center of the region of reach 60 by touching a point on the touchscreen display 30 and selects the shape and size of the region of reach 60 from a menu generated by the region of reach application 200.

According to a third region definition method, the processor 100 performs operations including measuring and storing location data that include locations on the touchscreen display 30 where a user has touched the touchscreen display 30, and defining the region of reach 60 based on the location data. For example, defining the region of reach 60 based on the location data includes defining an edge around the locations of the location data. Alternatively, a geometric shape, such as a circle or a rectangle, is fit to the location data to define the region of reach 60.

According to a fourth region definition method, the processor 100 performs operations including requesting input from a user to calibrate the region of reach 60 for the user. The requesting input includes prompting a user to grasp the device 10 in a favored way and to move the thumb 50 around the touchscreen display 30 in manner that facilitates defining the region of reach 60. For example, requesting input includes requesting that the user shorten and extend the thumb 50 (e.g., north and south) as far as possible in each direction and then move the thumb 50 side to side (e.g., east and west) as far as possible in each direction.

In certain embodiments, the processor 100 performs operations including defining the region of reach 60 (e.g., according to one of the region definition methods described above) and refining the region of reach 60 based on location data that is measured during ongoing use. For example, if location data is measured at locations outside of the region of reach 60, the region of reach 60 is expanded to include the location data. In certain embodiments, to trigger expansion of the region of reach 60, the location data is required to be outside the region of reach 60 with a certain frequency and/or by a certain distance.

Similarly, in certain embodiments, if there is an absence of location data at certain locations inside the region of reach 60 over a certain amount of time and/or by a certain distance, the region of reach 60 is reduced. Alternatively, the absence of location data at certain locations inside the region of reach 60 may be ignored as not reliably indicative of a smaller region of reach 60.

In addition, in certain embodiments, the region of reach 60 is reduced if a "pickup-reposition-resume" gesture is detected. For example, a "pickup-reposition-resume" gesture by a user includes contacting the touchscreen display 30 at the initial touchdown point 70 ($x_i$, $y_i$) on the surface of the touchscreen display 30 within the region of reach 60, making the motion 92 with the thumb 50, picking up the thumb 50 from the surface of the touchscreen display 30, relocating the thumb 50 and again contacting the touchscreen display 30 at a subsequent initial touchdown point 70 near the previous initial touchdown point 70, resuming or repeating the motion 92. This "pickup-reposition-resume" gesture is used as an indication that the region of reach 60 exceeds a user's actual reach with the thumb 50 by a significant margin. As such, the region of reach 60 is reduced to better match the user's actual reach with the thumb 50.

Alternatively, the region of reach 60 is determined based on other contexts. For example, a user profile for a known adult user is detected; a user profile for a known child user is detected; and a hand size derived from external sensors is detected.

Normal Mode Application

The normal mode application 300 includes computer executable instructions that, when executed by the processor 100, cause the processor 100 to perform operations including receiving input at any point on the touchscreen display 30 with a finger and responding to the input based on an application or other object associated with that point. The input from the user includes, for example, a "down-up" contact on the touchscreen display 30 by the thumb 50 to select an icon or link.

Scaling Mode Application

The scaling mode application 400 includes computer executable instructions that, when executed by the processor 100, cause the processor 100 to perform operations including receiving a first input from the thumb 50 of a user, calculating the scaled position 90 (x', y'), displaying and positioning the cursor 40 at the scaled position 90 (x', y') based on the first input, receiving a second input from the user, and responding to the second input based on an application or other object associated with the scaled position 90 (x', y'). The scaled position 90 (x', y') may be any point on the touchscreen display 30.

The receiving a first input from the thumb 50 of a user in the region of reach 60 includes receiving the direct position 80 (x, y) and the initial touchdown point 70 ($x_i$, $y_i$). For example, the first input from the user includes, for example, a "down" contact on the touchscreen display 30 with the thumb 50 at the initial touchdown point 70 ($x_i$, $y_i$) and sliding the thumb 50 from the initial touchdown point 70 ($x_i$, $y_i$) at the direct position 80 (x, y).

The calculating the scaled position 90 (x', y') includes calculating the scaled position 90 (x', y') as:

$$x'=x_i+b_x*(x-x_i)$$

$$y'=y_i+b_y*(y-y_i)$$

where b (including $b_x$ and $b_y$) is a scaling factor 410 described in further detail below.

The second input by the user includes, for example, lifting the thumb 50 from contact with the touchscreen display 30. Alternatively, lifting the thumb 50 may be part of the first input, and the second input includes a "down-up" tap on the touchscreen display 30 with the thumb 50.

The thumb 50 and the cursor 40 are both initially at the initial touchdown point 70 ($x_i$, $y_i$). Generally, the cursor 40 separates from the thumb 50 (e.g., for a scaling factor 410 with a value greater than one) as the thumb 50 moves in the region of reach 60 because the position of the cursor 40 is based on the value of the scaling factor 410 (b).

Displaying the cursor 40 provides feedback to the user that the scaling mode is activated. In addition, a visual feature is displayed at each of the initial touchdown point 70 ($x_i$, $y_i$) and the direct position 80 (x, y) to provide feedback to the user. For example, a pulsing glowing ball 420 that is large enough to be seen around the thumb 50 is displayed at the direct position 80 (x, y), and a plus sign (not shown) is displayed at the initial touchdown point 70 ($x_i$, $y_i$).

Further, to provide feedback to the user regarding how movement of the thumb 50 in the region of reach 60 affects movement of the cursor 40, the region of reach 60 is displayed and a line 430 is displayed as extending between the thumb 50 and the cursor 40. The length of the line 430 and rate of change of the length of the line 430 provides feedback about how the scaling factor 410 (b) affects the movement of the cursor 40. A line (not shown) or other feature may also be displayed between the initial touchdown point 70 ($x_i$, $y_i$) and each of the direct position 80 (x, y) and the scaled position 90 (x', y').

Scaling Factor Application

A scaling factor application 500 includes computer executable instructions that, when executed by the processor 100, cause the processor 100 to perform operations including determining the scaling factor 410 (b).

According to a first scaling factor method, the scaling factor 410 (b) is calculated based on the dimensions of the region of reach 60, dimensions of the touchscreen display 30, the initial touchdown point 70 ($x_i$, $y_i$), and a movement direction 510 (α) (e.g., the motion 92). For example, the movement direction 510 (α) is measured during the first milliseconds of motion of the thumb 50 from the initial touchdown point 70 ($x_i$, $y_i$) (e.g., between two endpoints). As another example, the movement direction 510 (α) is calculated on a running basis based on the initial touchdown point 70 ($x_i$, $y_i$) and a point that approximates the average movement direction of a curved line. Exemplary calculations of the average movement direction include the most recent milliseconds of movement, the most recent fraction of an inch of movement, or the entire movement. If a user creates an arc, the average movement direction compensates for a large difference in an initial movement direction and a most recent movement direction. The calculation of average movement is selected to approximate a user's intended movement direction.

The scaling factor 410 (b) maps a range of motion of the thumb 50 that is available, based on the initial touchdown point 70 ($x_i$, $y_i$) and the edge of the region of reach 60, to the range of motion of the cursor 40 needed to access the full area of the touchscreen display 30, based on the initial touchdown point 70 ($x_i$, $y_i$) and the edge of the touchscreen display 30. By using a scaling factor 410 (b) that is direction-dependent, as discussed below, the region of reach 60 can be mapped to the area of the touchscreen display 30 although the two regions are differently shaped.

Figure 3:
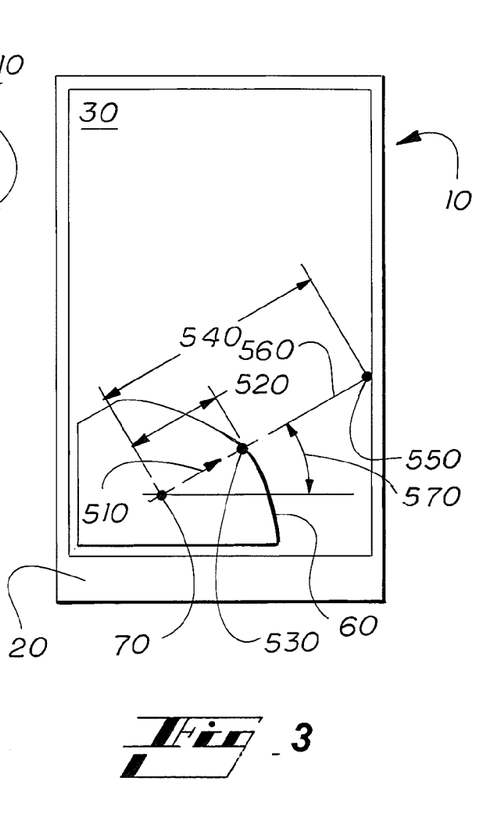
FIG. 3 illustrates an illustrative method of determining a scaling factor for positioning a cursor of the device of FIG. 1.

Referring to FIG. 3, according to an illustrative method, the scaling factor 410 (b) is calculated as:

$$b(\alpha)=d_{max}(\alpha)/r_{max}(\alpha)$$

$$r_{max}=\text{sqrt}((x_r-x_i)^2+((y_r-y_i)^2)$$

$$d_{max}=\text{sqrt}((x_d-x_i)^2+((y_d-y_i)^2)$$

where $r_{max}$ is a reach distance 520 between the initial touchdown point 70 ($x_i$, $y_i$) and a reach edge point 530 ($x_r$, $y_r$) and $d_{max}$ is a display distance 540 between the initial touchdown point 70 ($x_i$, $y_i$) and a display edge point 550 ($x_d$, $y_d$). The reach edge point 530 ($x_r$, $y_r$) is a point on the edge of the region of reach 60 that is intersected by a line 560 that is defined by the initial touchdown point 70 ($x_i$, $y_i$) and an angle 570 (a) of the movement direction 510. The display edge point 550 ($x_d$, $y_d$) is a point on the edge of the touchscreen display 30 that is intersected by the line 560.

The scaling factor 410 (b) maps the points between the initial touchdown point 70 ($x_i$, $y_i$) and the reach edge point 530 ($x_r$, $y_r$) to the points between the initial touchdown point 70 ($x_i$, $y_i$) and the display edge point 550 ($x_d$, $y_d$). In this manner, the region of reach 60 is mapped to the area of the touchscreen display 30 and the cursor 40 is able to be positioned about the entire area of the touchscreen display 30 based on movements of the thumb 50 within the region of reach 60.

Referring to the equations above for the scaled position 90 (x', y'), the scaling factor 410 (b) for each direction is calculated as:

$$b_x=b*\cos(\alpha)$$

$$b_y=b*\sin(\alpha)$$

As an example, for a reach distance 520 ($r_{max}$) of one inch in all of the movement directions 510 (α), movement toward a distant corner of the touchscreen display 30 has a scaling factor 410 (b) of five because the display distance 540 ($d_{max}$) in that movement direction 510 (α) is five inches, whereas movement toward a nearer corner might have a scaling factor 410 (b) of three because the display distance 540 ($d_{max}$) in the movement direction 510 (α) is three inches. The scaling method keeps the scaling factor 410 (b) as close to one as possible to optimize precision. If the display distance 540 is equal to the reach distance 520, the scaling factor 410 is one. For example, movement toward a lower left corner of the touchscreen display 30 have a scaling factor 410 of one.

To reduce computation time, scaling factors 410 (b) for each possible movement direction 510 (α) can be determined based on data for reach edge points 530 ($x_r$, $y_r$), display edge point 550 ($x_d$, $y_d$), and selected initial touchdown points 70 ($x_i$, $y_i$). Alternatively, scaling factors 410 (b) for some movement directions 510 (α) are pre-determined and scaling factors 410 (b) for unknown ones of the movement directions 510 (α) in-between pre-determined movement directions 510 (α) can be determined using interpolation.

In general, the scaling factor 410 (b) is inversely related to the size or dimensions of the region of reach 60. For example, a larger region of reach 60 generally results in a smaller scaling factor 410 (b) because the reach distance 520 ($r_{max}$) is larger. Similarly, a smaller region of reach 60 generally has a larger scaling factor 410 (b) because the reach distance 520 ($r_{max}$) is smaller.

The scaling factor 410 (b) is also highly dependent on the initial touchdown point 70 ($x_i$, $y_i$). In general, the closer the initial touchdown point 70 ($x_i$, $y_i$) is to the edge (e.g., reach edge point 530 ($x_r$, $y_r$)) of the region of reach 60, the higher the scaling factor 410 (b). Similarly, in general, the further the initial touchdown point 70 ($x_i$, $y_i$) from the edge (e.g., reach edge point 530 ($x_r$, $y_r$)) of the region of reach 60, the lower the scaling factor 410 (b).

The area of the touchscreen display 30 that is used to determine the scaling factor 410, can be adjusted to account for "inactive" portions of the touchscreen display 30, thereby defining a virtual touchscreen display 30 boundary that is within the actual physical touchscreen display 30 boundary. The area of the touchscreen display 30 affects the calculation of the display distance 540 ($d_{max}$). The area of the touchscreen display 30 is adjusted, for example, based on apps or touchscreen environments that are known to never need user input in certain portions of the screen; or apps or touchscreen environments that known to never need precision (affects whether the algorithm needs to time out and shift to precision mode).

According to a second amplification method, the scaling factor 410 (b) is a constant. For example, if the thumb 50 can reach one inch in any direction from the initial touchdown point 70 ($x_i$, $y_i$), for a scaling factor 410 (b) with a value of five, the cursor 40 could reach five inches in any direction from the initial touchdown point 70 ($x_i$, $y_i$). Such a reach for the cursor 40 would be sufficient to reach every point on the touchscreen display 30. For example, the scaling factor 410 in every direction can be calculated based on the largest display distance 540 in any direction and the reach distance 520 in that direction. According to an illustrative embodiment, the device 10 includes a configuration slider in a settings menu that lets the user manually adjust the scaling factor 410 (b).

Precision Application

A precision application 600 includes computer executable instructions that, when executed by the processor 100, cause the processor 100 to perform operations including those of one or more precision methods described below. The precision methods described below reduce or eliminate excessive sensitivity and inaccuracy such that the cursor 40 moves in a steady and precise way.

Figure 4:
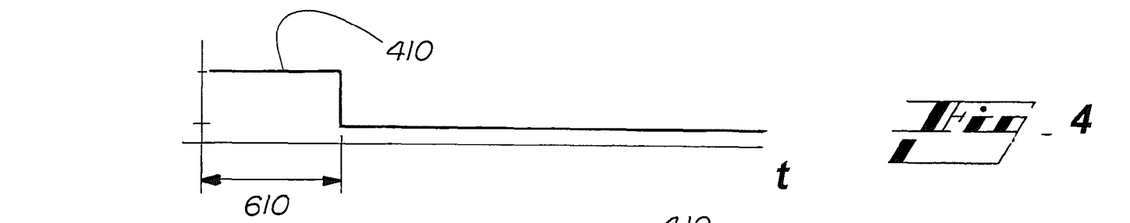
FIG. 4 illustrates a method of changing a scaling factor to increase precision in positioning a cursor of the device of FIG. 1.

Referring to FIG. 4, according to first precision method, the scaling factor 410 (b) is changed to a value of one (or another low value with low sensitivity) after a time period 610 (t).

Figure 5:
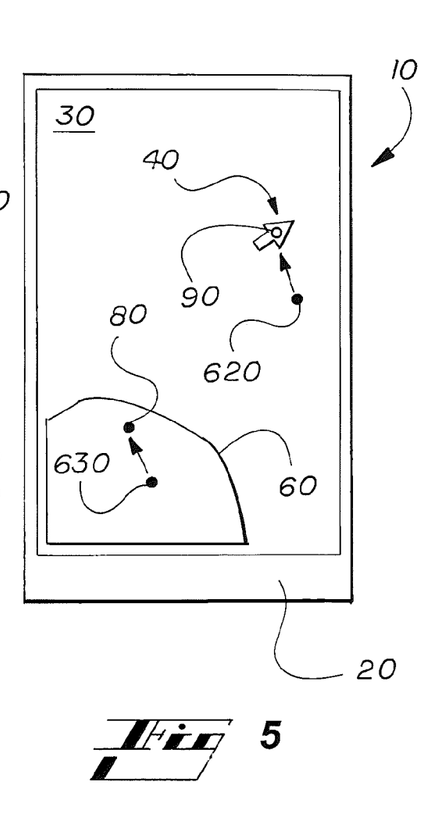
FIG. 5 illustrates a method of positioning a cursor of the device of FIG. 1.

Referring to FIG. 5, at the end of the time period 610 (t), the cursor 40 is at a timeout scaled position 620 ($x_t'$, $y_t'$) and the thumb 50 is at a timeout direct position 630 ($x_t$, $y_t$). After the end of the time period 610 (t), the scaled position 90 (x', y') is based on the timeout scaled position 620 ($x_t'$, $y_t'$), the timeout direct position 630 ($x_t$, $y_t$), and the direct position 80 (x, y). For example, the scaled position 90 (x', y') is calculated as:

$$x'=x_t'+b_x*(x-x_t)$$

$$y'=y_t'+b_y*(y-y_t)$$

Because of the reduction of the scaling factor 410 (b) (e.g., b=1), the cursor 40 is more precisely controlled after the end of the time period 610 (t).

As an example, within the time period 610 (t) of 0.25 seconds that begins with an initial touchdown of the thumb 50 on the touchscreen display 30, the movement of the thumb 50 in the region of reach 60 is amplified by a scaling factor 410 (b) of five to move the cursor 40 to the approximate desired area of the touchscreen display 30. Beyond the time period 610 (t), further movements of the still-down thumb 50 are amplified at a scaling factor 410 (b) of one. In other words, the initial "flip" of the thumb 50 towards an area of the touchscreen display 30 would float the cursor 40 to that part of the touchscreen display 30, and further movements of the thumb 50 would cause the cursor 40 to move parallel with the motion of the thumb 50 at a one-to-one ratio. In certain embodiments, a feature is displayed or changed to visually indicate that the movement of the cursor 40 is proportional to the movement of the thumb 50.

Figure 6:
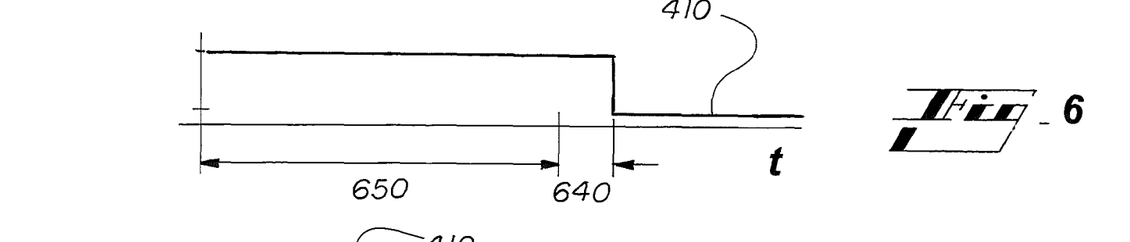
FIGS. 6 and 7 illustrate illustrative methods of changing a scaling factor to increase precision in positioning a cursor of the device of FIG. 1.

Referring to FIG. 6, according to a second precision method, the scaling factor 410 (b) is changed to a value of one (or otherwise reduced) as the thumb 50 comes to rest for a time period 640 after an initial movement from the initial touchdown point 70 ($x_i$, $y_i$) (represented by movement time period 650). In other words, as long as the thumb 50 is in motion, the cursor 40 is positioned with a higher scaling factor 410 (b). When movement of the thumb 50 pauses, the scaling factor 410 (b) becomes a value of one. Referring again to FIG. 5, at the end of the rest time period 640, the cursor 40 is at the timeout scaled position 620 ($x_t'$, $y_t'$) and the thumb 50 is at the timeout direct position 630 ($x_t$, $y_t$). After the end of the rest time period 640, the scaled position 90 (x', y') is based on the timeout scaled position 620 ($x_t'$, $y_t'$), the timeout direct position 630 ($x_t$, $y_t$), and the direct position 80 (x, y) as described above.

In certain embodiments, instead of one instantaneous drop in the scaling factor 410 (b) at the end of the time period 610 (t) or after a pause in motion of the thumb 50 (i.e., after the time period 640), the scaling factor 410 (b) may gradually or smoothly approach a value of one (or a reduced value) over a time period 660 (t). The scaling factor 410 (b) is a function of time. Each of the time period 660 (t) over which the scaling factor 410 (b) decreases and how the scaling factor 410 (b) changes over the time period 660 (t) (e.g., a nonlinear rate of decline) can be fixed, selected, adjusted, or learned. For example, the time period 660 (*t*) is adjusted by a user with a slider setting to adjust the behavior of the scaling factor 410 (*b*).

For example, a gradual decrease in the scaling factor 410 over the time period 660 includes a plurality of smaller decreases in the scaling factor 410 over smaller time periods. The smaller decreases in the scaling factor 410 sum to the overall decrease in the scaling factor 410 over the time period 660 and the smaller time periods sum to the time period 660. The gradual decrease is a series of decreases and the position of the cursor 40 at each decrease can be calculated as described above. At the end of each smaller time period, the cursor 40 is at a new timeout scaled position 620 ($x_t'$, $y_t'$) and the thumb 50 is at a new timeout direct position 630 ($x_t$, $y_t$). After the end of each smaller time period, the scaled position 90 (x', y') is based on the new timeout scaled position 620 ($x_t'$, $y_t'$), the new timeout direct position 630 ($x_t$, $y_t$), and the direct position 80 (x, y). The calculation repeats for each smaller time period.

The scaling factor 410 adjusts downwardly as a function of time until a selection is made or an abandonment is signaled. A gesture or other rule (e.g., timeout, jiggle gesture, aggressive high speed movement) is used to restore the scaling factor 410 to a higher value.

As an example, an elderly user might need a larger time period 660 (*t*) to see where the cursor 40 is and to read the nearby icons. A longer time period 660 (*t*) gives more time at which the movement of the cursor 40 is amplified by a higher scaling factor 410 (*b*). This allows more time to get the cursor 40 near a target before the scaling factor 410 (*b*) drifts towards a value of one.

In certain embodiments, to reduce sensitivity and inaccuracy due to a high scaling factor 410 (*b*), the cursor 40 is "sticky" and supports "snap-to-grid" or "snap-to-object" behavior. For example, because not all points on the touchscreen display 30 are of equal value and because selectable objects are likely to be most important in some contexts, the cursor 40 can exhibit stickiness, which causes it to snap-to icons, attributes of nearby objects (e.g., corners, edges, centers, etc.) or grid locations as it is moved over the touchscreen display 30. This reduces the inaccuracies caused by a high scaling factor 410 (*b*).

Scaling Mode Initiation Application

A scaling mode initiation application 700 includes computer executable instructions that, when executed by the processor 100, cause the processor 100 to perform operations including those of one or more invocation methods described below.

According to a first initiation method, operations include receiving an initiation input from a user on the touchscreen display 30 and determining whether the input initiates the scaling mode application 400. Inputs that initiate the scaling mode application 400 include pressing a physical button on the device 10 or a virtual button/icon on the touchscreen display 30; a pre-determined initiation gesture received on the touchscreen display 30; input to various sensors of the device (e.g., voice command); recognition via sensors (e.g., camera or edge touch sensors) that the device 10 is held in a way that requires scaling mode, combinations thereof, and the like.

A gesture is a hardware-detectable gesture. The gesture is uniquely associated with initiation of the scaling mode application 400 (e.g., differentiated from traditional gestures and functions) so that the scaling mode application 400 is not accidentally or unintentionally initiated when a user prefers to be in normal mode. The initiation gesture may be differentiated from traditional gestures such as "touch-down, touch-up," "touch-down, hold," and "double-click," "triple click," and the like. Alternatively, the initiation gesture may be a traditional gesture or a traditional gesture combined with another gesture.

For example, an initiation gesture includes a quick jiggle of the thumb 50 as it is in contact with the touchscreen display 30. The jiggle is a back-and-forth swipe (e.g., towards and away from a distant corner or a side-to-side sweeping motion). After the jiggle is recognized, the processor 100 initiates the scaling mode application 400.

After the initiation gesture initiates the scaling mode application 400, a separate gesture can control the movement of the cursor 40 (e.g., the first input of the scaling mode application 400). For example, a "touch down" sets the initial touchdown point 70 ($x_i$, $y_i$), a "move" to a direct position 80 (x, y) positions the cursor 40 at a scaled position 90 (x', y'). With respect to the scaling mode application 400, a second input can be a "touch-up" that inputs a selection at the scaled position 90 (x', y'). Alternatively, after a "touch-up," the cursor 40 remains on the touchscreen display 30 for a short time interval before fading away. While the cursor 40 remains on the touchscreen display 30, a second input includes another tap (e.g., "touch-down, touch-up") to make a selection at the scaled position 90 (x', y') of the cursor 40.

To indicate that the cursor 40 is ready to input a selection, the cursor 40 is displayed with a pulsing behavior for a fraction of a second after the "touch-up" gesture (e.g., after a user lifts the thumb 50). The cursor 40 is erased after a certain amount of time. If the user chooses not to act on it, the device 10 remains in scaling mode and the cursor 40 is configured to move from the last position with a scaling factor 410 value of one. Alternatively, the device 10 remains in scaling mode and the position of the cursor 40 is reset as if scaling mode application 400 has been initiated.

Figures 7, 8:
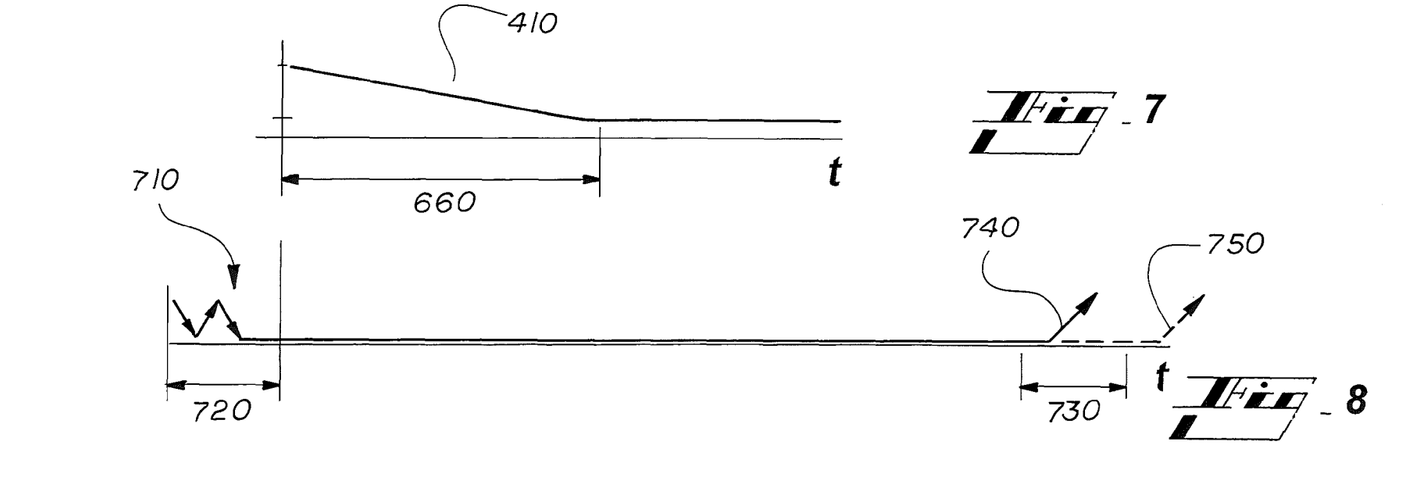
FIG. 8 illustrates an illustrative method of initiating the use of a cursor of the device of FIG. 1.

Referring to FIG. 8, the initiation gesture includes a "touch-down, touch-up, touch-down, hold-down" initiation gesture 710. If the initiation gesture is uniquely performed within a time period 720, the initiation gesture 710 initiates the scaling mode application 400. The point where the thumb 50 is at the end of the time period 720 sets the initial touchdown point 70 ($x_i$, $y_i$) and a "move" at a direct position 80 (x, y) positions the cursor 40 at a scaled position 90 (x', y').

With respect to the second input described with respect to the scaling mode application 400, FIG. 8 illustrates a time period 730 that starts when planar motion of the thumb 50 stops. If a "touch-up" (e.g., lift off) gesture 740 is recognized within the time period 730, a selection at the scaled position 90 (x', y') is made. If the thumb 50 is held down until after the end of the time period 730, the cursor 40 fades away and any "touch-up" gesture 750 is ignored. Other rules for recognizing selection and abandonment gestures can be implemented. For example, the rules can be based on empirical data that is optimized to determine the time to complete a gesture and how often the gesture is carried out. The most frequently used gestures are assigned the most convenient and rapid user interface gestures. Abandonment can be signaled by waiting for a long timeout, an "erase" gesture (e.g., a jiggle), During execution of the normal mode application 300, visual feedback is generally not provided for finger movement because the position of the fingertip is all that is used. The scaling mode application 400 is communicated to the user, for example, as described above, by displaying the region of reach 60, displaying a glowing ball under the thumb 50, displaying the cursor 40, displaying the line 430, and the like. Other symbols or indications may alternatively be used to communicate the initiation of the scaling mode application 400, the movement of and selection by the cursor 40 to the user, and the like.

If there is more than one region of reach 60, an illustrative method includes determining which region of reach 60 is to be utilized in the scaling mode application 400 based on information in the initiation gesture. For example, the initial touchdown point 70 ($x_i$, $y_i$) of the initiation gesture or a region of reach 60 defined by the initiation gesture is compared to the pre-defined regions of reach 60 and the closest match is selected as the region of reach 60 for current use. Alternatively, sensors such as a camera, touch sensors along the edge of the body 20, and the like can be used to determine which hand is being used. The region of reach 60 that corresponds to that hand is then selected.

Method

Figure 9:
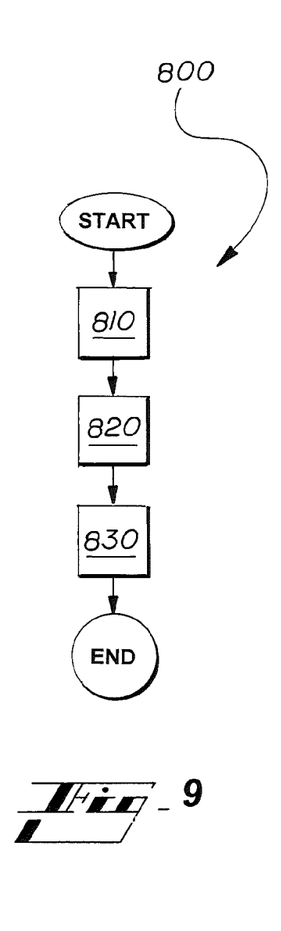
FIG. 9 illustrates an illustrative method of navigating the touchscreen display of the device of FIG. 1.

FIG. 9 shows an illustrative method 800 for navigating the touchscreen display 30, according to an embodiment of the present disclosure. It should be understood that the steps of the method 800 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims.

It should also be understood that the illustrated method 800 can be ended at any time. In certain embodiments, some or all steps of this process, and/or substantially equivalent steps are performed by execution of computer-readable instructions stored or included on a computer readable medium, such as the memory 110 described above, for example.

At a block 810, the processor 100 defines a region of reach 60 that corresponds to a portion of the touchscreen display 30.

At a block 820, the processor 100 calculates a scaling factor 410 based on dimensions of the region of reach 60, dimensions of the touchscreen display 30, a movement direction 510, and the initial touchdown point 70.

At a block 830, the processor 100 determines the scaled position 90 of the cursor 40 based on the initial touchdown point 70, the direct position 80, and the scaling factor 410.

The law does not require and it is economically prohibitive to illustrate and teach every possible embodiment of the present claims. Hence, the above-described embodiments are merely illustrations of implementations set forth for a clear understanding of the claimed subject matter. Variations, modifications, and combinations may be made to the above-described embodiments without departing from the scope of the claims. All such variations, modifications, and combinations are included herein by the scope of this disclosure and the following claims.

What is claimed is:

1. A computer-readable storage device storing instructions that, when executed by a processor of a device, cause the processor to perform operations comprising:
   determining a region of reach, wherein the region of reach corresponds to a portion of a touchscreen display of the device;
   calculating a value of a scaling factor based on factors comprising dimensions of the region of reach, dimensions of the touchscreen display, a movement direction, and an initial touchdown point;
   calculating a scaled position, wherein the scaled position is based on factors comprising the initial touchdown point, a direct position of a user contact on the touchscreen display, and the value of the scaling factor; and
   calculating the scaled position after a time period, wherein the scaled position calculated after the time period is based on factors comprising a timeout scaled position, a timeout direct position, and the direct position, wherein the timeout scaled position is the scaled position at an end of the time period, and wherein the timeout direct position is the direct position at the end of the time period.

2. The computer-readable storage device of claim 1, wherein the dimensions of the region of reach comprise a reach distance, the reach distance being a distance between a point on an edge of the region of reach and the initial touchdown point, the reach distance being measured in the movement direction, and wherein the dimensions of the touchscreen display include a display distance, wherein the display distance is a distance between a point on an edge of the touchscreen display and the initial touchdown point, the display distance being measured in the movement direction.

3. The computer-readable storage device of claim 2, wherein calculating the value of the scaling factor comprises calculating the display distance divided by the reach distance.

4. The computer-readable storage device of claim 1, wherein the operations further comprise:
   measuring location data that includes locations on the touchscreen display where a user has contacted the touchscreen display; and
   defining the region of reach based on at least one factor comprising the location data.

5. The computer-readable storage device of claim 1, wherein the operations further comprise causing a cursor to be displayed at the scaled position.

6. The computer-readable storage device of claim 1, wherein the operations further comprise generating an input to the touchscreen display at the scaled position based on an input received in the region of reach.

7. The computer-readable storage device of claim 1, wherein the operations further comprise causing a visual feature to be displayed at the direct position.

8. The computer-readable storage device of claim 1, wherein the value of the scaling factor is reduced after the time period.

9. The computer-readable storage device of claim 1, wherein the operations further comprise reducing the value of the scaling factor after a movement of the user contact on the touchscreen display comes to rest.

10. A device comprising:
    a processor; and
    a memory that stores computer-executable instructions that, when executed by the processor, cause the processor to perform operations comprising:
        determining a region of reach, wherein the region of reach corresponds to a portion of a touchscreen display of the device,
        calculating a value of a scaling factor based on factors comprising dimensions of the region of reach, dimensions of the touchscreen display, a movement direction, and an initial touchdown point,
        calculating a scaled position, wherein the scaled position is based on factors comprising the initial touchdown point, a direct position of a user contact on the touchscreen display, and the value of the scaling factor, and calculating the scaled position after a time period, wherein the scaled position calculated after the time period is based on factors comprising a timeout scaled position, a timeout direct position, and the direct position, wherein the timeout scaled position is the scaled position at an end of the time period, and wherein the timeout direct position is the direct position at the end of the time period.

11. The device of claim 10, wherein the dimensions of the region of reach include a reach distance, the reach distance being a distance between a point on an edge of the region of reach and the initial touchdown point, the reach distance being measured in the movement direction, and wherein the dimensions of the touchscreen display include a display distance, wherein the display distance is a distance between a point on an edge of the touchscreen display and the initial touchdown point, the display distance being measured in the movement direction.

12. The device of claim 11, wherein calculating the value of the scaling factor comprises calculating the display distance divided by the reach distance.

13. The device of claim 10, wherein the operations further comprise:
measuring location data that includes locations on the touchscreen display where a user has contacted the touchscreen display; and
defining the region of reach based on the location data.

14. The device of claim 10, wherein the operations further comprise causing a cursor to be displayed at the scaled position.

15. The device of claim 10, wherein the operations further comprise generating an input to the touchscreen display at the scaled position based on an input received in the region of reach.

16. The device of claim 10, wherein the operations further comprise causing a visual feature to be displayed at the direct position.

17. The device of claim 10, wherein the value of the scaling factor is reduced after the time period.

18. The device of claim 10, wherein the operations further comprise reducing the value of the scaling factor after a movement of the user contact on the touchscreen display comes to rest.

19. A method comprising:
determining, by a processor, a region of reach, wherein the region of reach corresponds to a portion of a touchscreen display of a device;
calculating, by the processor, a value of a scaling factor based on factors comprising dimensions of the region of reach, dimensions of the touchscreen display, a movement direction, and an initial touchdown point;
calculating, by the processor, a scaled position, wherein the scaled position is based on factors comprising the initial touchdown point, a direct position of a user contact on the touchscreen display, and the value of the scaling factor; and
calculating the scaled position after a time period, wherein the scaled position calculated after the time period is based on factors comprising a timeout scaled position, a timeout direct position, and the direct position, wherein the timeout scaled position is the scaled position at an end of the time period, and wherein the timeout direct position is the direct position at the end of the time period.

20. The method of claim 19, wherein the dimensions of the region of reach comprise a reach distance, the reach distance being a distance between a point on an edge of the region of reach and the initial touchdown point, the reach distance being measured in the movement direction, and wherein the dimensions of the touchscreen display include a display distance, wherein the display distance is a distance between a point on an edge of the touchscreen display and the initial touchdown point, the display distance being measured in the movement direction.

* * * * *